INVENTOR:

YVON L. DELBORD

By Wenderoth, Lind & Ponack

ATTORNEYS

350/181

Nov. 11, 1952 Y. L. DELBORD 2,617,877

COLOR REPRODUCTION SYSTEM

Filed Sept. 11, 1950 2 SHEETS—SHEET 2

INVENTOR:
YVON L. DELBORD
By Wenderoth, Lind & Ponack
ATTORNEYS

Patented Nov. 11, 1952

2,617,877

UNITED STATES PATENT OFFICE 2,617,877

COLOR REPRODUCTION SYSTEM

Yvon L. Delbord, Paris, France

Application September 11, 1950, Serial No. 184,279
In France September 12, 1949

1 Claim. (Cl. 178—5.4)

My invention relates to color reproduction systems, and more particularly to color television.

Color television systems heretofore proposed are subdivided in two categories, namely: simultaneous systems and sequentional systems.

In simultaneous systems, a plurality of carrier frequency channels are employed and a plurality of image signals, one for each color, are simultaneously transmitted over the respective channels. The colored images are projected simultaneously on a plurality of screens and these screens are superimposed with respect to the observer's eye by means of an optic system.

In sequential systems, the different image components are transmitted over a single channel sequentially and are received in sufficiently rapid succession so that the images reproduced therefrom create the illusion of a complete image in color when superimposed.

Sequential systems are also known in which pairwise assorted colored images are simultaneously projected on the photocathode of one single camera by means of an optic anamorphoser system adapted to reduce the height of the images, in which these images are scanned simultaneously and the couples of different colors of these images are transmitted sequentially.

My invention relates to improvements in color television sequential systems.

The object of the invention is to reduce the flickering of the resulting image. At the equality of flickering, the invention makes it possible to increase the number of monochromic components namely to obtain a more exact reproduction of colors without increasing the frame frequency, that is to say without increasing the band width used for television transmission.

In the sequential system most commonly used, namely tricolor system, the frame frequency for interlaced scanning is 60 times per second, and the successive analyses are the following ones:

1st sixtieth of a second, blue image, even lines
2nd sixtieth of a second, green image, odd lines
3rd sixtieth of a second, red image, even lines
4th sixtieth of a second, blue image, odd lines
5th sixtieth of a second, green image, even lines
6th sixtieth of a second, red image, odd lines Thus the even and odd lines are scanned in the three colors in one tenth of a second, and the colors succeed each other at the rate of 20 stimuli per second.

According to the present invention the four color components of a scene being televised are projected sequentially, pairwise, the colors and their order of succession being chosen in such a manner that a couple of colors giving a white resultant is followed by another couple of colors also giving a white resultant.

The two colored images corresponding to a couple of colors yielding white are anamorphosed in the ratio 1/2 in order to occupy on the screen of the camera tube the same height as a single image.

The invention will be better understood from the detailed description which follows and which is given with reference to the accompanying drawings in which.

Figure 1:
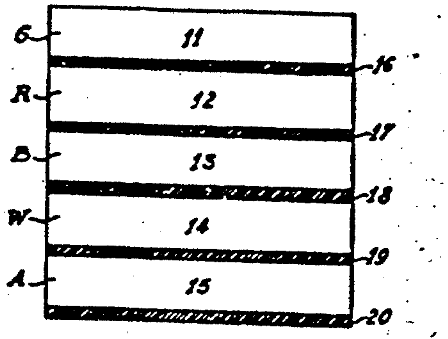
Figure 1 represents an image to be televised chosen for a better comprehension of the leading idea of the invention.

Figure 1 represents a colored image to be reproduced. It comprises five horizontal bands: 11 green, 12 red, 13 blue; 14 white and 15 A-color. Each band is separated from the following one by black bands 16, 17, 18, 19, 20 which are much narrower than the former ones.

Consider for example a record of this image transmitted by prior art tricolor television at a frame frequency of 60 times per second. For this perusal no modifications involved by so-called interlaced scanning systems are to be taken into consideration, as they do not interfere with an explanation of the principle of the invention. No distinction will therefore be made, in the successive analyses mentioned above, between the first sixtieth of a second and the third one, between the second and the fourth, between the third and the sixth. A complete trichromic scanning of the image will be thus carried out in $\frac{1}{20}$ of a second.

Assume that the trichromic filters have a transmission curve corresponding to the selected colors (green, red, blue) and therefore absorb two thirds of the incident white light.

Figure 2:
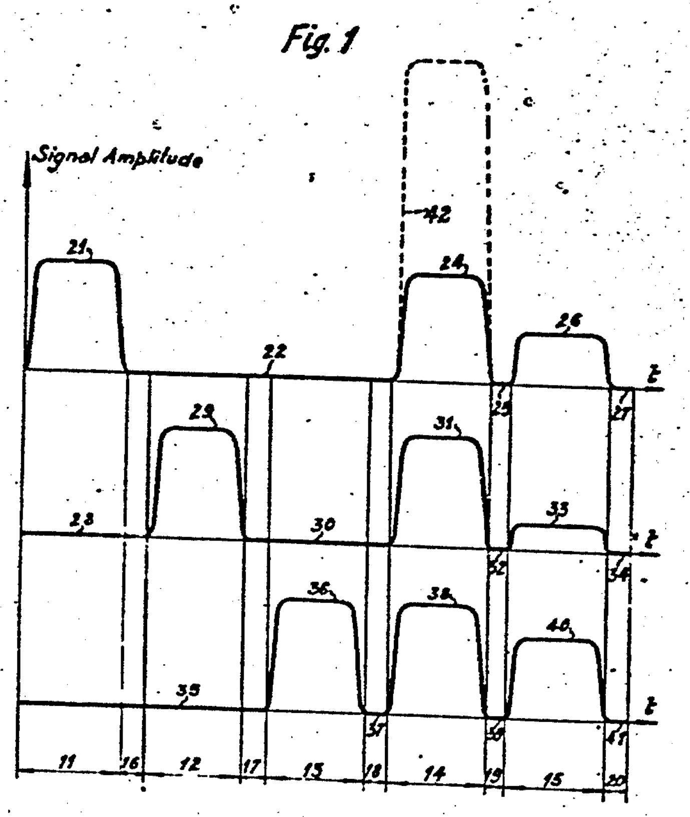
Figure 2 represents analytic signals plotted on time base of an image in trichromic system.

Figure 2 represents the amplitude of the image signal plotted on a time base. The portion comprised between 0 and $\frac{1}{60}$ of a second corresponds to the scanning through the green filter, the portion comprised between the $\frac{1}{60}$ and $\frac{2}{60}$ of a second corresponds to the scanning through the red filter and the portion comprised between $\frac{2}{60}$ of a second and $\frac{3}{60}$ of a second corresponds to the scanning through the blue filter. During the first sixtieth of a second the curve comprises a stimulus 21 representing the image of the green band through a green filter, the null portion 22 representing at the same time the black bands 16, 17 and 18 and of the red band 12 and blue band 13 scanned through the green filter, a stimulus 24 representing the image of the white band 14, the null dip 25 representing the image of the black band 19, a stimulus 26 representing the image of the band 15, and a null 27 representing the image of the black band 20.

During the second sixtieth of a second, there successively appears a null 28 (green band 11 scanned through the red filter, and the black band 16), a stimulus 29, (red band 12) a null 30 (black band 17, blue band 13 scanned through the red filter and the black band 18), a stimulus 31 (white band 14 scanned through the red filter), a null dip 32 (black band 19), a stimulus 33 (band 15 scanned through the red filter), a null dip 34 (black band 20).

During the third sixtieth of a second, there successively appears a null 35 (green band 11 and red band 12 scanned through the blue filter, and black bands 16 and 17), a stimulus 36 (blue band 13) a null dip 37 (black band 18), a stimulus 38 (white band 14 scanned through the blue filter), a null dip 39 (black band 19), a stimulus 40 (band 15 scanned through the blue filter), a null dip 41 (black band 20).

At the end of one twentieth of a second the white appears by combination of pulses 24, 31, 38 with an amplitude shown at 42.

For each band of color: green, red, blue, white, complex, a luminous pulse is perceived by the eye every 1/20 of a second, but for the first three colors the intensity of this pulse is at most equal to 1/3 of the intensity of a white pulse. The maximum of flicker is obtained for the white, as the flicker frequency is the same for all the luminous pulses whilst the brightness is the greatest for the white. In order to eliminate the flicker for the white color with respect to one of the basic colors green, red or blue, it would be necessary to increase threefold the frame frequency.

On the other hand the persistence of vision is not the same for each of the elementary colors, its maximum corresponding to the blue, and therefore every displacement of the eye with respect to the screen would be accompanied by a very troublesome blue flash.

The substance of the invention is to choose four selective filters, pairwise associated in two couples, such that each of the two couples gives the white, and to arrange for these couples of filters to periodically succeed each other.

Figure 3:
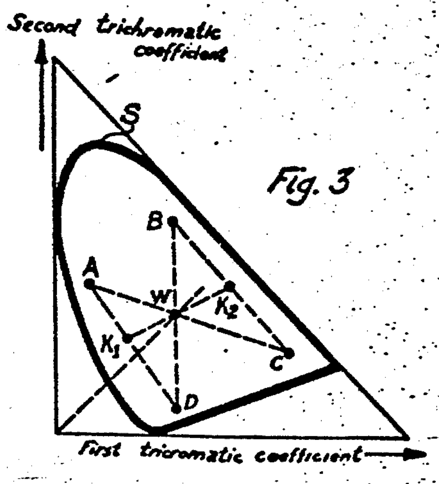
Figure 3 illustrates the Maxwell's triangle of colors.

Figure 3 represents the Maxwell's chromatic diagram of the International Illumination Commission as plotted on the axes suggested by Mr. W. D. Wright in "The Measurement of Colours" (Adam Hilger, Ltd., London, 1946).

The points A, B, C, D represent the characteristics of the chosen filters. The points representing the filters are, of course, located inside of the curve S which represents the place of the visible spectrum. These points may be more or less distant from this place without departing from the principle of the invention. The greater the area of the rectangle ABCD, the greater is the number of faithfully reproduced colors.

The couples of associated filters should have the color A and C, on the one hand, and B and D, on the other hand, which respectively give a white resultant, i. e. the straight lines AC and BD meet in a point W (white), and the opacity of the filters is devised in such a manner that the "center of gravity" of the "masses" (the filter's luminosity divided by its ordinate in the chromatic diagram) A and C, on the one hand, and B and D, on the other hand, be the point W.

But the filters of colors A and D on the one hand and B and C on the other hand, should not be coupled together, because in this case the white would appear at the end of the two analyses according to composition $K_1$ very different from the white, and it would become white only after four successive analyses, i. e. the two successive couples would give at first $K_1$, then $K_2$, and the combination of $K_1$ and $K_2$ would give the white.

Figure 4:
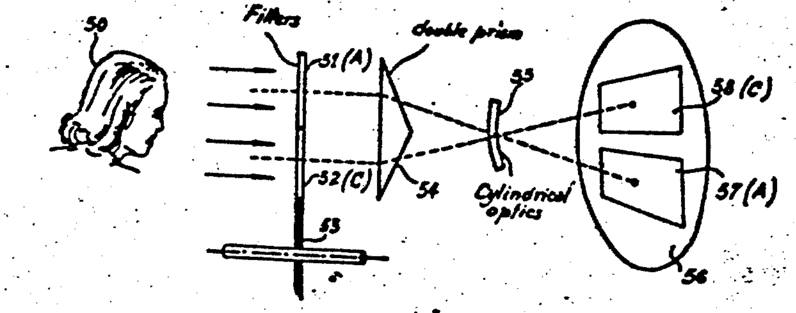
Figures 4 and 5 represent diagrammatically a device for practical embodiment of the invention.
Figure 5:
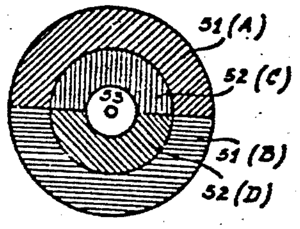

Referring to Figures 4 and 5, 50 represents the object to be televised. 51 and 52 denote two filters of respective characteristics A and C (or B and D) fitted into a rotating disc 53 (Figure 5), 54 is a double prism, 55 is an optical device adapted to anamorphise, in a ratio of two to one, the height of the colored images A (or B) and C (or D). An anamorphoser apparatus is described in U. S. Patent No. 1,897,752, issued February 14, 1933 to Georges Chretien. Under these conditions two images 57 and 58 are obtained on the photocathode 56 of the video pickup device, the total height of which is that of a normal image. The double image is scanned in one sixtieth of a second, 57 being of A-color and 58 of C-color, and then, the disc 53 having meantime rotated by a half-revolution, the double image is once more scanned in one sixtieth of a second, 57 being of B-color and 58 being of D-color.

Although the invention has been described with reference only to television, its scope, however, appears sufficient from the above description to enable those skilled in the art to apply the same to other problems of color reproduction.

What I claim is:

Color television transmitting apparatus comprising a television pick-up tube having a mosaic screen, a color filter disc including four light filters arranged in two dissimilar sets of balanced complementary colors, the two filters of each set having respectively the shape of a half circle and a half ring concentric to said circle, a double prism adapted to focus the light rays coming from the scene to be televised through the two filters of one set onto a cylindrical optics and a cylindrical optics for forming two side by side images having balanced complementary colors and optically compressed in the ratio two along the direction perpendicular to their common side.

YVON L. DELBORD.

REFERENCES CITED

The following references are of record in the file of this patent:

UNITED STATES PATENTS

| Number | Name | Date |
|---|---|---|
| 1,122,455 | Wohl | Dec. 29, 1914 |
| 1,607,593 | O'Grady | Nov. 16, 1926 |
| 1,897,752 | Chretien | Feb. 14, 1933 |
| 2,207,409 | Newcomer | July 9, 1940 |
| 2,429,849 | Somers | Oct. 28, 1947 |
| 2,465,652 | Legler | Mar. 29, 1949 |
| 2,520,842 | Juillet | Aug. 29, 1950 |